(12) United States Patent
Lawson et al.

(10) Patent No.: US 10,688,831 B2
(45) Date of Patent: Jun. 23, 2020

(54) TIRE TREAD WITH SIPE

(71) Applicants: Robert Cecil Lawson, Pelzer, SC (US); Sadi Kose, Greer, SC (US); Phillip Check, Simpsonville, SC (US)

(72) Inventors: Robert Cecil Lawson, Pelzer, SC (US); Sadi Kose, Greer, SC (US); Phillip Check, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 282 days.

(21) Appl. No.: 15/518,971

(22) PCT Filed: Oct. 15, 2015

(86) PCT No.: PCT/US2015/055747
§ 371 (c)(1),
(2) Date: Apr. 13, 2017

(87) PCT Pub. No.: WO2016/061358
PCT Pub. Date: Apr. 21, 2016

(65) Prior Publication Data
US 2017/0239998 A1    Aug. 24, 2017

Related U.S. Application Data

(60) Provisional application No. 62/065,354, filed on Oct. 17, 2014.

(51) Int. Cl.
*B60C 11/12* (2006.01)
*B60C 11/03* (2006.01)
*B60C 11/01* (2006.01)

(52) U.S. Cl.
CPC .......... *B60C 11/0323* (2013.01); *B60C 11/01* (2013.01); *B60C 11/0306* (2013.01);
(Continued)

(58) Field of Classification Search
CPC .. B60C 11/01; B60C 11/0323; B60C 11/1281
See application file for complete search history.

(56) References Cited

U.S. PATENT DOCUMENTS 2,642,914 A * 6/1953 Palko ................. B60C 11/0302
152/209.28
3,875,986 A * 4/1975 Boileau ............... B60C 11/0306
152/209.24
(Continued)

FOREIGN PATENT DOCUMENTS

JP         01-101205 A  *  4/1989
WO       2012058171 A1      5/2012

OTHER PUBLICATIONS

Machine translation for Japan 01-101205 (Year: 2018).*
(Continued)

*Primary Examiner* — Steven D Maki
(74) *Attorney, Agent, or Firm* — Hahn Loeser & Parks LLP; Bret A. Hrivnak

(57) ABSTRACT

Particular embodiments of the invention include a tire tread having a plurality of tread elements including one or more shoulder elements arranged along a first lateral side edge of the tread. The one or more shoulder elements include a recessed terminal side spaced apart from the first lateral side edge, where the recessed terminal side is offset in a direction of the tread width towards the second lateral side edge from a pair of adjacent terminal sides of the one or more shoulder elements. A sipe is arranged in connection with a submerged void within the tread thickness, where the sipe and submerged void extend in a direction of the tread width towards a second lateral side edge from the recessed terminal side such that the sipe and submerged void are recessed from the pair of adjacent terminal sides.

6 Claims, 1 Drawing Sheet

(52) U.S. Cl.
CPC ..... B60C 11/1281 (2013.01); *B60C 2011/036* (2013.01); *B60C 2011/0337* (2013.01); *B60C 2011/1209* (2013.01)

(56) References Cited

U.S. PATENT DOCUMENTS

| | | | | |
|---|---|---|---|---|
| D283,609 S * | 4/1986 | Kawabata | ............... | D12/566 |
| 5,031,680 A * | 7/1991 | Kajikawa | ............... | B60C 11/11 |
| | | | | 152/209.18 |
| 5,385,189 A * | 1/1995 | Aoki | ............... | B60C 11/04 |
| | | | | 152/209.21 |
| 2003/0192634 A1* | 10/2003 | Hino | ............... | B60C 11/0306 |
| | | | | 152/209.18 |
| 2009/0283188 A1* | 11/2009 | Itoh | ............... | B60C 11/0309 |
| | | | | 152/209.18 |
| 2016/0214438 A1* | 7/2016 | Yamakawa | ............... | B60C 11/01 |
| 2017/0057295 A1* | 3/2017 | Kageyama | ............... | B60C 11/11 |

OTHER PUBLICATIONS

PCT/US2015/055747 International Search Report and Written Opinion dated Jan. 22, 2016, 14 pages.
Cooper-Tires-Weather-Master-ST2-tire-test-02.JPG, retrieved from the internet on Apr. 5, 2017, 1 page: URL: http://autoguide.com/gallery/gallery.php/?g2_view=largephotos.Largephotos&g2_itemid=738209.
weathermasterst2.png (450×342), retrieved from the internet on Apr. 5, 2017, 1 page: URL: http://us.coopertire.com/Coopertiresconsumer2013/media/TireImages/TreadLarge/weathermasterst2.png?width=450&height=342&ext=.png.
hitto-tire-terra-grappler-g2.jpg (478×534), retrieved from the internet on Apr. 5, 2017, 1 page: URL: http://www.wheelfire.com/imagesproducts/nitto-tire-terra-grappler-g2.jpg.
Tread-G2-Terra-Grappler-Nitto-9-18-14.jpg (620×413), retrieved from the internet on Apr. 5, 2017, 1 page: URL: http://www.off-road.com/images/content/Tread-G2-Terra-Grappler-Nitto-9-18-14.jpg.

\* cited by examiner

TIRE TREAD WITH SIPE

This application claims priority to, and the benefit of, U.S. Provisional Patent Application No. 62/065,354, filed Oct. 17, 2014 with the U.S. Patent Office, which is hereby incorporated by reference.

BACKGROUND OF THE INVENTION

Field of the Invention

This invention relates generally tire treads, and more specifically, tire treads having sipes arranged at or near a lateral tread edge.

Description of the Related Art

Tire tread designs utilize sipes (also referred to as "lamelles") characterized as extending toward the tire-operating surface of the tread from submerged voids arranged within the thickness of the tread, which are referred to herein as "sipe-submerged void combined tread features". One exemplary sipe-submerged void combined tread feature is a teardrop sipe. Sipe-submerged void combined tread features are commonly used to achieve certain tire tread performance as the tire tread wears and nears the end of its intended life. This is achieved by exposing additional void to the tire-operating surface by way of the submerged void as the tire tread wears. Upon exposure of the submerged void, the tire-operating surface contains additional surface and volumetric void, which receives water or other material arranged along a road surface to better maintain tire traction.

When a sipe-submerged void combined tread feature is arranged along a tread edge, such that it terminates along an exposed side of a tread element, the tread feature is susceptible to excessive wear and tearing during tire operation, such as when undergoing cornering maneuvers. Accordingly, there is a need to better protect and maintain the integrity of these sipe-submerged void combined tread features during tire operation.

SUMMARY OF THE INVENTION

Particular embodiments of the invention include a tire tread, and a tire having the tire tread. In certain embodiments, the tire tread includes a thickness bounded by a tire-operating side and a width bounded by a pair of lateral side edges. The tire-operating side is configured to engage a tire operating surface during tire operation. The tire-operating side also includes a plurality of tread elements configured to engage the tire operating surface for providing traction during tire operation. The plurality of tread elements including one or more shoulder elements arranged along a first lateral side edge of the pair of lateral side edges. The one or more shoulder elements have a recessed terminal side spaced apart from the first lateral side edge, where the recessed terminal side is offset in a direction of the tread width towards the second lateral side edge from a pair of adjacent terminal sides of the one or more shoulder elements. A sipe is arranged in connection with a submerged void within the tread thickness, the submerged void being offset from the tire operating side and the sipe extending from the void in a direction of the tire operating side, where the sipe and submerged void extend in a direction of the tread width towards the second lateral side edge from the recessed terminal side such that the sipe and submerged void are recessed from the pair of adjacent terminal sides.

The foregoing and other objects, features, and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

Figure 1:
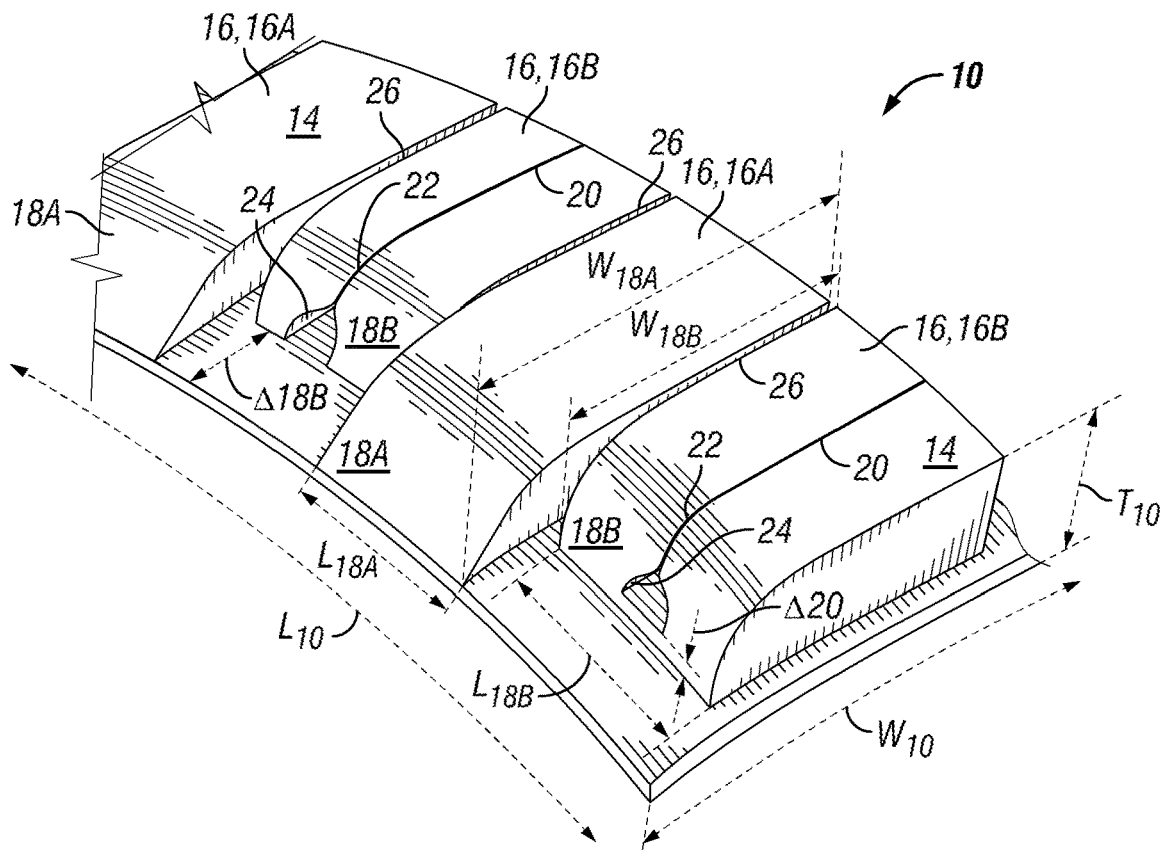
FIG. 1 is a partial perspective view of a tire tread, showing a plurality of tread elements arranged at or near a lateral tire tread edge, in accordance with an embodiment of the invention.

Particular embodiments of the invention comprise a tire tread, the tread configured to better protect sipe-submerged void features arranged along lateral sides of the tread.

The tire tread includes a thickness bounded by a tire-operating side, where the tire-operating side is configured to engage a tire operating surface, such as a ground or road surface, for the purpose of providing tire traction during tire operation. Often, the tire-operating side includes a pattern of discontinuities configured to provide tire traction performance for particular driving conditions. Discontinuities can include sipes and grooves or other voids. A sipe is a very narrow or thin void or slit, such that, during tire operation, opposing sides of the sipe contact or abutting one another. A sipe is distinguishable from a void, such as a lateral or longitudinal groove, where a void is sized such that during tire operation, opposing sides of the void remain spaced apart and do not contact one another. By doing so, a void remains open to accept water, mud, snow, or any other material during tire operation for the purpose of facilitating traction between the tread and an intended tire operating surface, such as a road surface. The pattern of discontinuities generally form one or more, or a plurality of, tread elements configured to engage the tire operating surface to provide traction. Tread elements comprise, for example, tread blocks, lugs, or ribs. A tread block or lug extends partially along a length of a tire tread, while a rib extends continuously along the length of a tire tread. It is appreciated that the tire tread also includes a width bounded by a pair of lateral side edges and extending in a lateral direction, and a length extending in a lengthwise direction. The length, width, and thickness of the tread all extend perpendicular to one another.

A sipe or groove, or any discontinuity more generally, as discussed in association with any embodiment of the invention, may extend in any direction of the tread length, width, or thickness along any desired path, and the thickness of any such sipe or groove may be constant or variable. Accordingly, any such path may comprise a linear path or non-linear path, which may be arcuate or undulating, for example. "Undulating" connotes that the path alternates between multiple changes in direction resulting in a plurality of peaks and valleys, for example. In other words, an undulating path zigzags back and forth multiple instances to provide two or more peaks or valleys (that is, apexes and troughs). Exemplary undulating paths include a sinusoidal, saw-tooth, or square-wave path. Therefore, it is contemplated that the non-linear path may be curvilinear or comprise a plurality of linear segments, or any combination thereof.

It is appreciated that the plurality of tread elements include one or more shoulder elements arranged along a first lateral side edge of the pair of lateral side edges. In other words, it can also be said the one or more shoulder elements are arranged adjacent to or in close proximity to the first lateral side edge. The one or more shoulder elements are the closest of the plurality of tread elements to be arranged relative the first lateral side edge. Nonetheless, it is understood that the one or more shoulder elements may be aligned with or spaced apart from the first lateral side edge.

In particular embodiments, the one or more shoulder elements has a recessed terminal side spaced apart from the first lateral side edge, where the recessed terminal side is offset in a direction of the tread width towards the second lateral side edge from a pair of adjacent terminal sides of the one or more shoulder elements. In such embodiments, it is understood that the recessed terminal side may be associated with (that is, arranged along) one or a plurality of shoulder elements. Additionally, it is appreciated that the recessed terminal side may be arranged on the same shoulder element, or on a different shoulder element, than any shoulder element upon which one of the pair of adjacent terminal sides is arranged. For example, in certain variations, the recessed lateral side is associated with a first shoulder element of the one or more shoulder elements, and each of the pair of adjacent terminal sides are associated with another shoulder element of the one or more shoulder elements. By further example, in other variations, the recessed lateral side is associated with a first shoulder element of the one or more shoulder elements, where one of the pair of adjacent terminal sides is also associated with the first shoulder element and the other of the pair is associated with another shoulder element of the one or more shoulder elements. In describing a terminal side being associated with or arranged on a shoulder element, it is understood that the terminal side referenced is, or forms, a terminal side of the associated shoulder element.

As to the arrangement of the recessed terminal side and each of the pair of adjacent terminal side, it is appreciated that any arrangement or relationship there between may be employed, so long as the recessed terminal side with a sipe-submerged void combined tread feature (as discussed herein) is recessed inwardly in a direction of the second tread edge. In one exemplary variation, a lateral sipe is arranged between the recessed terminal side and each of the pair of adjacent terminal sides. A lateral sipe is understood to extend in any direction of the tread width. In other words, a lateral sipe may extend either (1) in a direction perpendicular to the length of the tire tread or (2) in a direction biased relative to the direction perpendicular to the tread length (that is, the widthwise direction) by an angle 45 degrees or less. In such variations, any relationship between the sipe and the sipe-submerged void combined tread feature may be employed. For example, the sipe arranged in connection with the submerged void may be uniformly or variably spaced from at least one of the sipes arranged between the recessed terminal side and each of the pair of adjacent terminal sides. In another exemplary variation, a lateral groove is arranged between the recessed terminal side and each of the pair of adjacent terminal sides. A lateral groove is understood to extend in any direction of the tread width. In other words, a lateral groove may extend either (1) in a direction perpendicular to the length of the tire tread or (2) in a direction biased relative to the direction perpendicular to the tread length (that is, the widthwise direction) by an angle 45 degrees or less. In such variations, any relationship between the groove and the sipe-submerged void combined tread feature may be employed. For example, the sipe arranged in connection with the submerged void is variably spaced from at least one of the grooves arranged between the recessed terminal side and each of the pair of adjacent terminal sides.

It is appreciated that the recessed terminal side may be spaced any distance from the first lateral side edge of the tread and from the pair of adjacent lateral side edges. For example, in particular instances, the recessed terminal side is uniformly spaced from the first lateral side edge of the tread and/or from the pair of adjacent lateral side edges. By further example, in particular instances, the recessed terminal side is variably spaced from the first lateral side edge of the tread and/or from the pair of adjacent lateral side edges.

The tire tread further includes a sipe arranged in connection with a submerged void within the tread thickness, which is also referred to herein as a sipe-submerged void combined tread feature. As noted herein, a sipe-submerged void combined tread feature is a sipe arranged in combination with a submerged void, such that the sipe extends from the submerged void. The sipe may be any sipe contemplated herein, or otherwise known to one of ordinary skill. The submerged void is a void submerged below the tire operating surface, such that the submerged void is offset from the tire operating side in a direction of the tread thickness. The sipe extends from the submerged void in a direction of the tire operating side, where such direction may extend entirely in a direction of the tread thickness (that is, in a direction perpendicular to both the tread length and width), or at any angle biased therefrom by less than 90 degrees. By extending from the submerged void, the sipe is in fluid communication with the submerged void. It is also appreciated that both the sipe and submerged void extend in a direction of the tread width towards the second lateral side edge from the recessed terminal side, to form a length of both the sipe and submerged void. By virtue of extending inwardly from the recessed terminal side, the sipe and submerged void are recessed from the pair of adjacent terminal sides.

As noted, with regard to the sipe-submerged void combined tread feature, it is appreciated that each of the sipe and submerged void may comprise any known design. Exemplary sipe designs are noted elsewhere herein, which may extend along any linear or non-linear path and in any direction of the tread. Exemplary submerged void designs include voids of uniform or variable thickness or width, and of any cross-sectional shape (sectioned in the directions of height and width).

Variations of the tire tread include arranging an additional one or more sipe-submerged void combined tread features along the recessed terminal side of the one or more shoulder, which may be of the same or different design than the initial sipe-submerged void combined tread feature. For example, in particular embodiments, a second sipe in connection with a second submerged void is arranged along the recessed terminal side.

In particular embodiments, the tire tread is attached to a tire carcass to form a tire. It is appreciated that the tire tread may have been formed prior to attachment to the tire carcass, in accordance with any known manner, such as by molding, for example. In such instances, a pre-molded tire tread may be employed to form a retreaded tire or a new tire. It is also appreciated that a tire tread may be attached to a tire carcass and subsequently molded and cured with the tire carcass, such as when forming a new tire. It is understood that a tire may be a pneumatic tire or non-pneumatic tire.

Particular embodiments of the tire treads discussed above will now be described in further detail below in association with the figures filed herewith describing exemplary embodiments of the tire treads.

Figure 2:
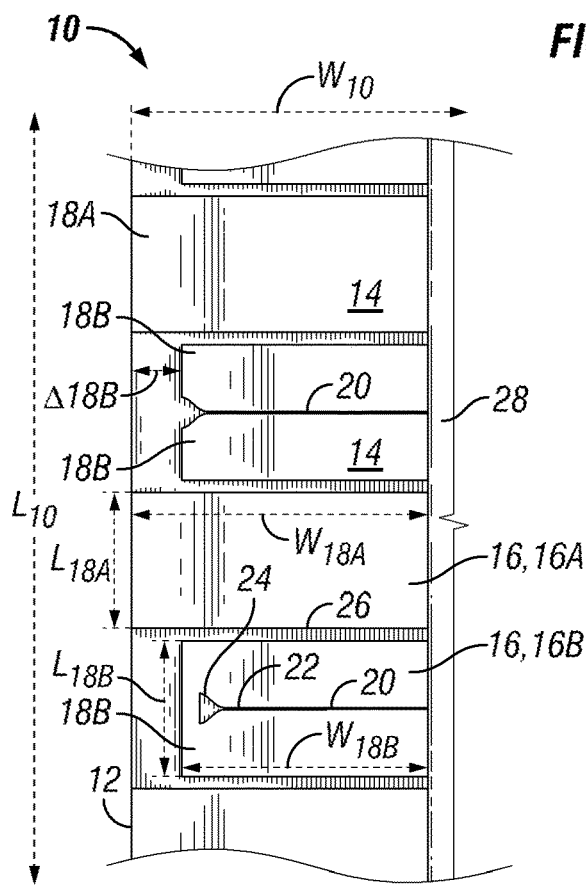
FIG. 2 is a top view of the tire tread edge of FIG. 1.

In an exemplary embodiment shown in FIGS. 1 and 2, a tire tread 10 is shown having a plurality of tread elements 16 comprising a plurality of shoulder elements arranged along a lateral tread edge 12. The lateral tread edge 12 is one of a pair of lateral tread edges defining a width $W_{10}$ of the tire tread. The tire tread also includes a length $L_{10}$ and a thickness $T_{10}$, where the width $W_{10}$, length $L_{10}$, and thickness $T_{10}$ all extend in directions perpendicular to each other. Thickness $T_{10}$ extends from a tread bottom side to a tread top side 14, which is referred to as the tire-operating side.

As to shoulder elements 16, each comprise a lug or block defined in part by discontinuities 26 and 28. In the embodiment shown, discontinuities are lateral discontinuities comprising lateral sipes. In the embodiment shown, the lateral sipes extend entirely in the direction of the tread width $W_{10}$, although any one or both could extend partially in the direction of the tread width as appreciated and discussed elsewhere herein. The lateral sipes also extend along a linear path in a direction of the tread width $W_{10}$ and in a direction of the tread thickness, although, the lateral sipes may extend in any one or both directions along a non-linear path as appreciated and discussed elsewhere herein.

Shoulder elements 16 are also defined in part by a terminal side 18A, 18B, which is also referred to as an exposed or external lateral side wall of the shoulder element, which faces the lateral side edge 12. In particular, a recessed terminal side 18B is shown arranged between a pair of adjacent terminal sides 18A. Each recessed terminal side 18B defines a corresponding width $W_{18B}$ extending across each associated tread element 16, 16B, where width $W_{18B}$ extends from each recessed terminal side to an opposing side of the tread element in a direction of the tread width $W_{10}$. Likewise, each adjacent terminal side 18A defines a corresponding width $W_{18A}$ extending across each associated tread element 16, 16A, where width $W_{18A}$ extends from each recessed terminal side to an opposing side of the tread element in a direction of the tread width $W_{10}$.

It is noted that terminal side 18B of shoulder element 16B is recessed or spaced apart from an adjacent terminal side 18A, and away from the first lateral side edge 12 by a distance $\Delta_{18B}$ in a direction of the tread width $W_{10}$ towards a second lateral side edge. It is understood that the offset distance $\Delta_{18B}$ may be any desired distance to sufficiently protect recessed terminal side 18B and any sipe-submerged void combined tread feature 20 arranged therein. For example, in particular embodiments, offset distance $\Delta_{18B}$ is equal to or greater than 1.5 mm (millimeter). By further example, in certain embodiments, offset distance $\Delta_{18B}$ is equal to 5% to 40% of a width defining an adjacent tread element 16A, such as width $W_{18A}$, for example. In the embodiment shown, the offset (or recess) distance $\Delta_{18B}$ is uniform along a length $L_{18B}$ of terminal side 18B, although it is appreciated that the offset distance $\Delta_{18B}$ may be non-uniform or variable along the terminal side length. Accordingly, the length $L_{18B}$ of terminal side 18B may extend along a linear path (shown) or any non-linear path described herein (in association with sipes and grooves, for example).

Terminal sides 18A of each shoulder element 16A are shown to align with, or terminate along, first lateral side edge 12 of tire tread 10. It is appreciated, however, in any other embodiment contemplated herein, that each such terminal side 18A may be spaced apart or offset a distance from the first lateral side edge 12, so long as an offset distance $\Delta_{18B}$ remains between each of the pair of adjacent terminal sides 18A and the recessed terminal side 18B. Furthermore, it is appreciated, however, in any other embodiment contemplated herein, that each of the pair of adjacent terminal sides 18A may be offset different distances from first lateral side edge 12. In particular embodiments, to facilitate sufficient protection of the recessed terminal side 18B and any sipe-submerged void combined tread feature 20 arranged therein, the length $L_{18A}$ of one or both adjacent terminal sides 18A is equal to or greater than the length $L_{18B}$ of the recessed terminal side 18B.

With continued reference to the embodiment in FIGS. 1 and 2, extending into shoulder element 16B from terminal side 18B is a sipe-submerged void combined tread feature 20 comprising a sipe 22 arranged in connection with a submerged void 24. As can be seen, sipe 22 extends in a direction of the tread thickness $T_{10}$ from submerged void 24. As noted above, the sipe-submerged void combined tread feature 20 may be arranged in any manner within a tread element 16B. In one example shown, a first sipe-submerged void combined tread feature 20 is aligned with a bottom of the tread element 16B, where a bottom of the submerged void 24 is arranged along a bottom of the tread element. In another example shown, a second sipe-submerged void combined tread feature 20 is spaced or offset above a bottom of the tread element 16B or skid depth by a distance $\Delta_{20}$, where a bottom of the submerged void 24 is spaced or offset above a bottom of the tread element. The skid depth is defined as the deepest void depth of the tread defining a usable depth of the tread.

Figure 3:
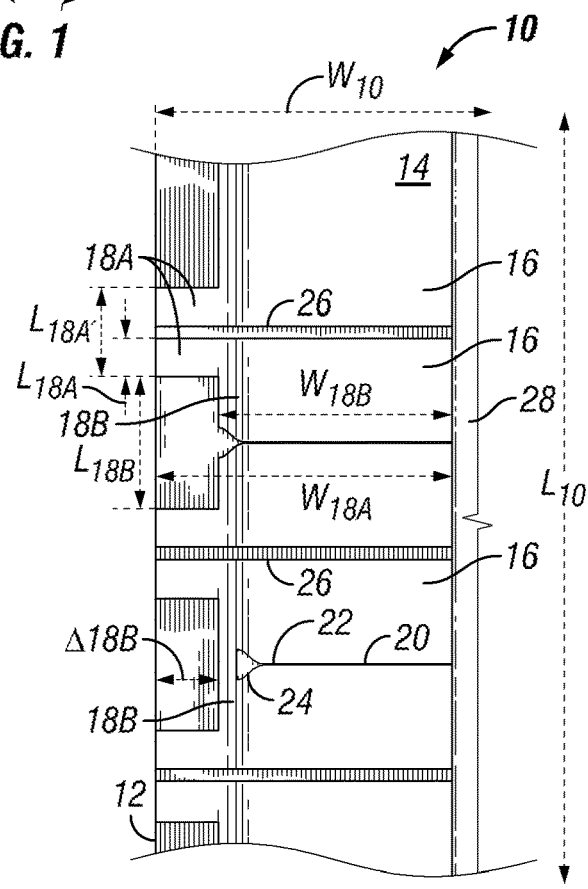
FIG. 3 is a top view of an alternative tire tread edge.

With reference to another embodiment, shown in FIG. 3, a recessed terminal side 18B is shown arranged between a pair of adjacent terminal sides 18A all arranged within a single shoulder element 16. In such embodiments, adjacent shoulder elements 16 are separated by a discontinuity 26 comprising a lateral groove. While it is appreciated that in any embodiment, length $L_{18A}$ of one or both adjacent terminal sides 18A are equal to or greater than the length $L_{18B}$ of recessed terminal side 18B as suggested above, it is also appreciated that when the length $L_{18A}$ is less than length $L_{18B}$, additional protection for a terminal side having a sipe-submerged void combined tread feature may be obtained by way of an adjacent terminal side 18A of an adjacent shoulder element 16, such as is exemplarily shown in FIG. 3. As such, a combined length $L_{18A'}$ is provided, equal to the combined length of adjacent terminal side lengths $L_{18A}$ and the width of any intervening discontinuity 26. While length $L_{18A'}$ may be equal to any length, in certain embodiments, $L_{18A'}$ is equal to or greater than recessed terminal side length $L_{18B}$.

It is appreciated that a tire tread may optionally include a discontinuity arranged between a pair of spaced apart recessed terminal ends, where the adjacent terminal end is arranged between the recessed terminal ends spaced apart in a direction of the tread length. For example, the tire tread of FIG. 3 may optionally include the discontinuity 26 arranged between recessed terminal ends 18B. As such, when the tire tread of FIG. 3 does not include one of the optional discontinuities 26, it can be said that a terminal side 18A extends continuously between a pair of recessed terminal sides 18B. In such embodiments, adjacent shoulder elements 16 are not separated by a discontinuity 26—contrary to the embodiment shown in FIG. 3. It is also contemplated that, in lieu of extending fully across a width of any tread element 16, such as is shown in FIG. 3 by example, any such discontinuity may instead extend partially across a width of any tread element 16, whether or not extending from an adjacent terminal side 18A. In extending partially, the discontinuity may extend continuously, partially across the width or discontinuously, partially across the width.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A tire tread comprising:
    a thickness bounded by a tire-operating side and a width bounded by a pair of lateral side edges, the tire-operating side configured to engage a tire operating surface during tire operation and including a plurality of tread elements configured to engage the tire operating surface to provide traction;
    the plurality of tread elements including a plurality of shoulder elements arranged along a first lateral side edge of the pair of lateral side edges, one shoulder element of the plurality of shoulder elements having a recessed terminal side spaced apart from the first lateral side edge, where the recessed terminal side is offset in a direction of the tread width towards the second lateral side edge from a pair of adjacent terminal sides of adjacent shoulder elements of the plurality of shoulder elements, the recessed terminal side being arranged adjacent to and between the pair of adjacent terminal sides;
    a sipe arranged in connection with a submerged void within the tread thickness, the submerged void being offset from the tire operating side and the sipe extending from the void in a direction of the tire operating side, where the sipe and submerged void are arranged between the pair of adjacent terminal sides and extend in a direction of the tread width towards the second lateral side edge from the recessed terminal side such that the sipe and submerged void are recessed from the pair of adjacent terminal sides, where each adjacent terminal side of the pair of adjacent terminal sides is free of any sipe arranged in connection with any submerged void and where a sipe is arranged between the recessed terminal side and each adjacent terminal side of the pair of adjacent terminal sides, and where each adjacent terminal side of the pair of adjacent terminal sides extends from the recessed terminal side to another recessed terminal side of another shoulder element of the plurality of shoulder elements.

2. The tire tread of claim 1, where a second sipe in connection with a second submerged void is arranged along the recessed terminal side.

3. The tire tread of claim 1, where the sipe arranged in connection with the submerged void is variably spaced from at least one of the sipes arranged between the recessed terminal side and each of the pair of adjacent terminal sides.

4. The tire tread of claim 1, where the recessed terminal side is uniformly spaced from the first lateral side edge of the tread.

5. The tire tread of claim 1, where the recessed terminal side is variably spaced from the first lateral side edge of the tread.

6. The tire tread of claim 1, where the tire tread is attached to a tire carcass to form a tire.

* * * * *